United States Patent
Shin

(10) Patent No.: US 11,897,553 B2
(45) Date of Patent: Feb. 13, 2024

(54) TORQUE ESTIMATION APPARATUS AND STEERING ASSIST APPARATUS AND METHOD

(71) Applicant: HL MANDO CORPORATION, Pyeongtaek (KR)

(72) Inventor: Donghoon Shin, Seoul (KR)

(73) Assignee: HL MANDO CORPORATION, Pyeongtaek (KR)

(*) Notice: Subject to any disclaimer, the term of this patent is extended or adjusted under 35 U.S.C. 154(b) by 207 days.

(21) Appl. No.: 17/567,973

(22) Filed: Jan. 4, 2022

(65) Prior Publication Data

US 2022/0212713 A1   Jul. 7, 2022

(30) Foreign Application Priority Data

Jan. 6, 2021  (KR) .................. 10-2021-0001298

(51) Int. Cl.
*B62D 5/04*  (2006.01)
*B62D 15/02*  (2006.01)

(52) U.S. Cl.
CPC ........... *B62D 5/046* (2013.01); *B62D 15/021* (2013.01)

(58) Field of Classification Search
CPC ........ B62D 5/046; B62D 15/021; B62D 6/10; B62D 5/0463
USPC ........................................... 701/41
See application file for complete search history.

(56) References Cited

U.S. PATENT DOCUMENTS

2019/0315398 A1* 10/2019 Moreillon ............ B62D 5/0463
2023/0174143 A1*  6/2023 Ghoneim ............. B62D 15/021
                                                      180/443

* cited by examiner

*Primary Examiner* — Yi-Kai Wang
(74) *Attorney, Agent, or Firm* — Harvest IP Law, LLP

(57) ABSTRACT

The present invention relates to steering apparatuses, and more specifically, to torque estimation apparatuses, and steering assist apparatuses and methods. The torque estimation apparatus can include a first estimator for estimating an eccentric mass of a steering wheel, and a second estimator for estimating an eccentric torque of the steering wheel.

20 Claims, 11 Drawing Sheets

TORQUE ESTIMATION APPARATUS AND STEERING ASSIST APPARATUS AND METHOD

CROSS-REFERENCE TO RELATED APPLICATION

This application claims the priority benefit of Republic of Korea Patent Application No. 10-2021-0001298, filed on Jan. 6, 2021 in the Korean Intellectual Property Office, the disclosure of which is incorporated herein by reference in its entirety.

BACKGROUND

Field of the Disclosure

The present disclosure relates to steering systems, and more specifically, to torque estimation apparatuses, and steering assist apparatuses and methods.

Description of the Background

A steering system is typically used for changing a steering angle of a vehicle wheel based on a steering force (e.g., rotational force) applied to a steering wheel by an operator, such as a driver of a vehicle. Recently, as being implemented in an electric power steering system, the electric power steering (EPS) has been applied to a vehicle in order to reduce the steering force of the steering wheel and ensure the stability of the steering.

Further, the demand for research and development for estimating the steering intention of a driver has significantly increased with respect to the vehicle steering system.

SUMMARY

Embodiments of the present disclosure provide torque estimation apparatuses capable of accurately estimating the steering intention of a driver.

Further, embodiments of the present disclosure provide steering assist apparatuses capable of accurately estimating the steering intention of a driver.

Further, embodiments of the present disclosure provide steering assist methods capable of accurately estimating the steering intention of a driver.

According to one aspect of the present disclosure, a torque estimation apparatus is provided that includes a first estimator capable of calculating a standard deviation of driver torques, and estimating an eccentric mass of a steering wheel based on the standard deviation of the driver torques, and a second estimator capable of estimating an eccentric torque of the steering wheel based on the eccentric mass of the steering wheel using a steering angle detected by a steering angle sensor.

According to another aspect of the present disclosure, a steering assist apparatus is provided that includes a sensor module including a steering angle sensor for detecting a steering angle, and a steering control module for controlling the operation of a steering motor by controlling a steering motor power supply based on a steering motor control signal, wherein the steering control module calculates a standard deviation of driver torques, estimates an eccentric mass of a steering wheel based on the standard deviation of the driver torques, estimates an eccentric torque of the steering wheel based on the eccentric mass of the steering wheel using the steering angle detected by the steering angle sensor, and generates the steering motor control signal based on a driver torque in which the eccentric torque of the steering wheel is reflected.

According to further another aspect of the present disclosure, a steering assist method is provided that includes calculating a standard deviation of driver torques and estimating an eccentric mass of a steering wheel based on the standard deviation of the driver torques, estimating an eccentric torque of the steering wheel based on the eccentric mass of the steering wheel using a steering angle detected by a steering angle sensor, and generating a steering motor control signal based on a driver torque in which the eccentric torque of the steering wheel is reflected and controlling the operation of a steering motor by controlling a steering motor power supply based on the steering motor control signal.

According to embodiments of the present disclosure, it is possible to provide torque estimation apparatuses capable of accurately estimating the steering intention of a driver.

According to embodiments of the present disclosure, it is possible to provide steering assist apparatuses capable of accurately estimating the steering intention of a driver.

According to embodiments of the present disclosure, it is possible to provide steering assist methods capable of accurately estimating the steering intention of a driver.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings.

DETAILED DESCRIPTION

Figure 1:
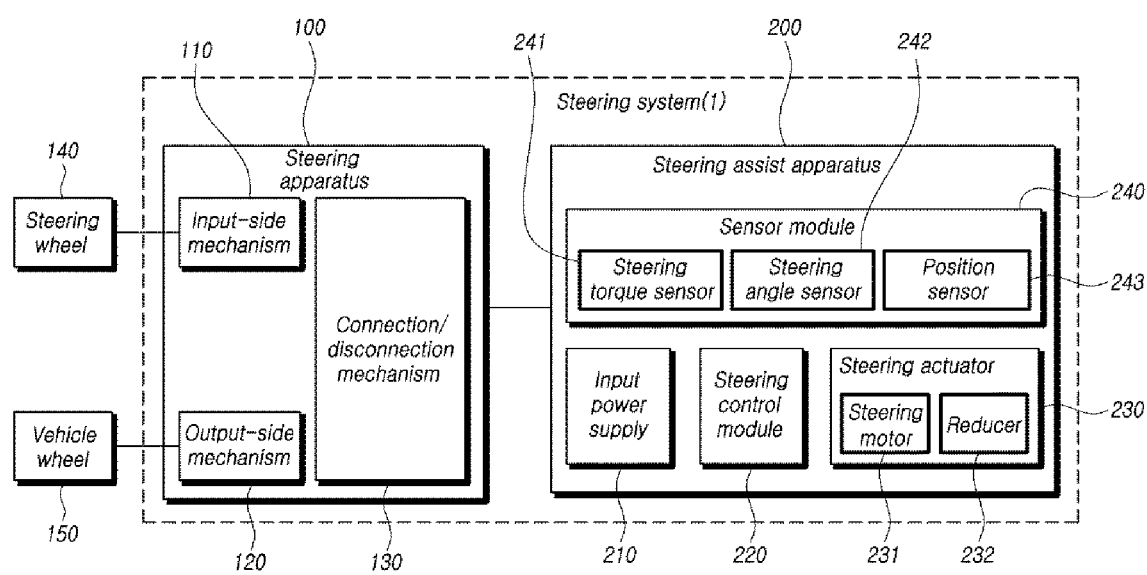
FIG. 1 is a block diagram of a steering system according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together. Meanwhile, when numerical values for elements included in embodiments of the present disclosure or their associated information (e.g., levels etc.) are described, even when specific relevant descriptions are not given, the numerical values or the associated information may be interpreted as including a margin of error that can be caused by several factors (e.g., factors in the process, internal or external impact, noise, etc.).

FIG. 1 is a block diagram of a steering system according to aspects of the present disclosure.

Referring to FIG. 1, the steering system 1 according to aspects of the present disclosure may include at least one of a steering apparatus 100 and a steering assist apparatus 200. The steering apparatus 100 and the steering assist apparatus 200 may be connected by at least one of electrical, magnetic, and mechanical connections.

In some embodiments, one or more steering apparatuses 100 may be used. The steering apparatus 100 can change a steering angle of at least one vehicle wheel 150 based on a steering force (e.g., rotational force, etc.) applied to a steering wheel 140. The steering apparatus 100 may include at least one of an input-side mechanism 110, an output-side mechanism 120, and a connection/disconnection mechanism 130. The input-side mechanism 110, the output-side mechanism 120, and the connection/disconnection mechanism 130 may be connected by at least one of electrical, magnetic, and mechanical connections.

In some embodiments, one or more input-side mechanisms 110 may be used. The input-side mechanism 110 may be connected to the steering wheel 140. The input-side mechanism 110 can rotate in a rotational direction of the steering wheel 140 or in a direction opposite to the rotational direction of the steering wheel 140. The input-side mechanism 110 may include a steering shaft connected to the steering wheel 140; however, embodiments of the present disclosure are not limited thereto. For example, any mechanisms (or devices) capable of rotating (or moving) in the rotational direction of the steering wheel or in a direction opposite to the rotational direction of the steering wheel may be included in the input-side mechanism 110.

In some embodiments, one or more output-side mechanisms 120 may be used. The output-side mechanism 120 may be connected to the input-side mechanism 110 by at least one of electrical and mechanical connections. The output-side mechanism 120 may be connected to the vehicle wheel 150 and can change a steering angle (or movement, etc.) of the vehicle wheel 150. The output-side mechanism 120 may include at least one of a pinion, a rack, a tie rod, and a knuckle arm; however, embodiments of the present disclosure are not limited thereto. For example, any mechanisms (or devices) capable of changing a steering angle (or, movement, etc.) of the vehicle wheel may be included in the output-side mechanism 120.

In some embodiments, one or more connection/disconnection mechanisms 130 may be used. The connection/disconnection mechanism 130 may be connected to the input-side mechanism 110 and the output-side mechanism 120. The connection/disconnection mechanism 130 may mechanically or electrically connect or disconnect the input-side mechanism 110 and the output-side mechanism 120. The connection/disconnection mechanism 130 may include a clutch; however, embodiments of the present disclosure are not limited thereto. For example, any mechanisms (or devices) capable of mechanically or electrically connect or disconnect the input-side mechanism and the output-side mechanism may be included in the connection/disconnection mechanism 130.

The steering apparatus 100 according to aspects of the present disclosure may include a type of steering apparatus in which the input-side mechanism and the output-side mechanism are mechanically connected, a type of steering apparatus in which the input-side mechanism and the output-side mechanism are electrically connected (e.g., a steer-by-wire (SbW) steering apparatus), and a type of steering apparatus in which the input-side mechanism and the output-side mechanism are connected via the connection/disconnection mechanism (e.g., a steer-by-wire (SbW) steering apparatus including a clutch).

In some embodiments, one or more steering wheels 140 and one or more vehicle wheels 150 may be used. The steering wheel 140 and the vehicle wheel 150 may be separately provided as shown in FIG. 1; however, embodiments of the present disclosure are not limited thereto. For example, the steering wheel 140 and the vehicle wheel 150 may be included in the steering apparatus 100.

In some embodiments, one or more steering assist apparatuses 200 may be used. The steering assist apparatus 200 may be connected to the steering apparatus 100. The steering assist apparatus 200 can provide an assist steering force to the steering apparatus 100.

The steering assist apparatus 200 according to aspects of the present disclosure may include at least one of an input power supply 210, a steering control module 220, a steering actuator 230, and a sensor module 240. The input power supply 210, the steering control module 220, the steering actuator 230, and the sensor module 240 may be connected by at least one of electrical, magnetic, and mechanical connections.

In some embodiments, one or more input power supplies 210 may be used. The input power supply 210 may include at least one of a DC power supply and an AC power supply. In particular, the DC power supply may include a battery or the like; however, embodiments of the present disclosure are not limited thereto. For example, any power supplies capable of providing DC power may be included in the DC power supply.

In some embodiments, the sensor module 240 may include at least one sensor. The sensor may include at least one of a steering torque sensor 241, a steering angle sensor 242, and a position sensor 243e; however, embodiments of the present disclosure are not limited thereto. For example, the sensor may include any sensors capable of measuring a status of a vehicle and a steering status of the vehicle.

In some embodiments, one or more steering torque sensors 241 may be used. The steering torque sensor 241 can measure a steering torque of the steering wheel and provide information on the steering torque of the steering wheel to the steering control module 220. In some embodiments, one or more steering angle sensors 242 may be used. The steering angle sensor 242 can measure a steering angle of the steering wheel and provide information on the steering angle of the steering wheel to the steering control module 220. In some embodiments, one or more position sensors 243 may be used. The position sensor 243 can measure at least one of a position of the input-side mechanism, a position of the output-side mechanism, and a position of a steering motor, and provide at least one of information on the position of the input-side mechanism, information on the position of the output-side mechanism, and information on the position of the steering motor to the steering control module 220.

The steering torque sensor 241, the steering angle sensor 242, and the position sensor 243 may be separately provided as shown in FIG. 1; however, embodiments of the present disclosure are not limited thereto. For example, at least one of the steering torque sensor 241, the steering angle sensor 242, and the position sensor 243 may be included in at least one of the input-side mechanism 110, the output-side mechanism 120, the connection/disconnection mechanism 130, the steering wheel 140, the vehicle wheel 150, the input power supply 210, the steering control module 220, and the steering actuator 230 (a steering motor 231, or a reducer 232).

In some embodiments, one or more steering control modules 220 may be used. The steering control module 220 may be connected to the input power supply 210. The steering control module 220 can receive electrical energy from the input power supply 210 and filter noise of the electrical energy.

The steering control module 220 can generate a steering motor control signal based on information (e.g., at least one of steering torque information, steering angle information, position information, and vehicle speed information) provided by each component in the steering system 1.

The steering control module 220 can generate an assist steering force from the filtered electrical energy according to the steering motor control signal, and control the steering actuator 230 (or the steering motor 231) based on the assist steering force.

In some embodiments, one or more steering actuators 230 may be used. The steering actuator 230 may be connected to the steering control module 220. The steering actuator 230 can assist the steering of the steering apparatus 100 by operating based on the assist steering force provided from the steering control module 220.

The steering actuator 230 may include at least one of the steering motor 231 and the reducer 232. In some embodiments, one or more steering motors 231 and one or more reducers 232 may be used. At least one of the steering motor 231 and the reducer 232 may be connected to the steering control module 220.

In a case where the steering actuator 230 includes the steering motor 231, the steering motor 231 can assist the steering of the steering apparatus 100 by operating based on the assist steering force provided from the steering control module 220.

In a case where the steering actuator 230 includes the steering motor 231 and the reducer 232, the steering motor 231 can operate based on the assist steering force provided from the steering control module 220, and the reducer 232 can assist the steering of the steering apparatus 100 by operating according to the operation of the steering motor 231.

The steering motor 231 may include at least one of a single winding type steering motor and a dual winding type steering motor; however, embodiments of the present disclosure are not limited thereto. For example, any motors capable of assisting the steering of the steering apparatus may be used as the steering motor 231.

The steering motor 231 may include at least one of a single-phase type motor, a three-phase type motor, and a five-phase type motor; however, embodiments of the present disclosure are not limited thereto. For example, any motors capable of assisting the steering of the steering apparatus may be used as the steering motor 231.

The steering motor 231 may include at least one of a DC motor and an AC motor (e.g., a synchronous motor, an induction motor and/or the like); however, embodiments of the present disclosure are not limited thereto. For example, any motors capable of assisting the steering of the steering apparatus may be used as the steering motor 231.

Figure 2:
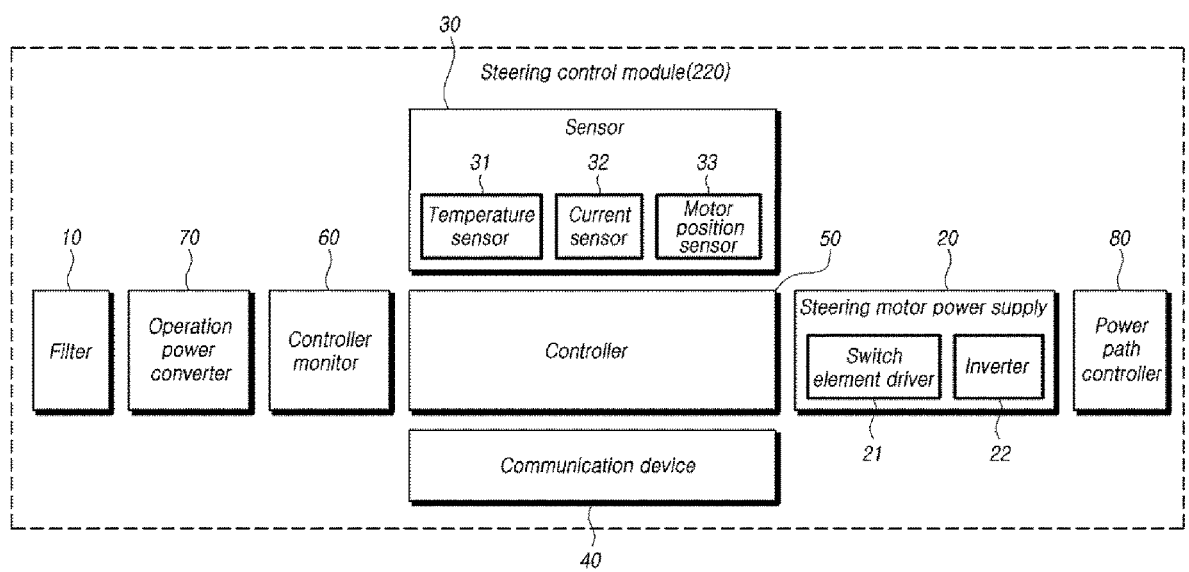
FIG. 2 is a functional block diagram of a steering control module of the steering system according to aspects of the present disclosure.

FIG. 2 is a functional block diagram of the steering control module of the steering system according to aspects of the present disclosure.

Referring to FIG. 2, the steering control module 220 according to embodiments of the present disclosure may include at least one of a filter 10, a steering motor power supply 20, a sensor 30, a communication device 40, a controller 50, a controller monitor 60, an operation power converter 70, and a power path controller 80. The filter 10, the steering motor power supply 20, the sensor 30, the communication device 40, the controller 50, the controller monitor 60, the operation power converter 70, and the power path controller 80 may be connected by at least one of electrical, magnetic and mechanical connections.

In some embodiments, one or more filters 10 may be used. The filter 10 may be connected to input power supply. The filter 10 can filter noise of electrical energy supplied from the input power supply and provide electrical energy resulting from the filtering to the steering motor power supply 20 and the operation power converter 70.

In some embodiments, one or more steering motor power supplies 20 may be used. The steering motor power supply 20 may be connected to the filter 10 and can receive the filtered electrical energy. The steering motor power supply 20 may be connected to the controller 50 and can receive a steering motor control signal. The steering motor power supply 20 can generate an assist steering force by converting the filtered electric energy based on the steering motor control signal, and control the steering motor based on the assist steering force.

The steering motor power supply 20 may include at least one of a switch element driver 21 and an inverter 22. In some embodiments, one or more switch element drivers 21 may be used, and one or more inverters 22 may be used. The switch element driver 21 and the inverter 22 may be connected by at least one of electrical, magnetic, and mechanical connections.

The switch element driver 21 can receive a steering motor control signal from the controller 50, and generate a switch element control signal based the steering motor control signal and provide the generated signal to the inverter 22. The inverter 22 can generate an assist steering force by converting the filtered electric energy from the filter according to the switch element control signal.

The inverter 22 may include a switch, a transistor, and/or the like; however, embodiments of the present disclosure are not limited thereto. For example, the inverter 22 may include any elements (or devices) capable of generating an assist steering force by converting the electric energy according to the switch element control signal, In a case where the inverter 22 includes a field effect transistor (FET), the switch element driver 21 may be a gate driver. Thus, the gate driver can receive a steering motor control signal from the controller 50, and generate a gate control signal based the steering motor control signal and provide the generated signal to the inverter 22. The inverter 22 can generate an assist steering force by converting the filtered electric energy from the filter according to the gate control signal.

In some embodiments, one or more power path controllers 80 may be used. The power path controller 80 may be located between the steering motor power supply 20 (or the inverter 22) and the steering actuator 230 (or the steering motor 231), and can supply the assist steering force supplied by the steering motor power supply 20 (or the inverter 22) to the steering actuator 230 (or the steering motor 231), or block the supply of the assist steering force to the steering actuator 230 (or the steering motor 231).

The power path controller 80 may include at least one phase disconnector (PCO). The phase disconnector is the element or circuit capable of cutting off a phase, and may include at least one of a switch, a circuit breaker, a disconnecting switch, and an on-off controller, and a transistor; however, embodiments of the present disclosure are not limited thereto. For example, the phase disconnector may include any elements or circuits capable of cutting off a phase.

The sensor 30 may include at least one of a temperature sensor 31, a current sensor 32, and a motor position sensor 33; however, embodiments of the present disclosure are not limited thereto. For example, the sensor 30 may include any sensors capable of measuring a status of the steering system (or the steering control module). In some embodiments, one or more power temperature sensors 31, one or more current sensor, 32, and one or more motor position sensors 33 may be used. The temperature sensor 31, the current sensor 32, and the motor position sensor 33 may be connected by at least one of electrical, magnetic, and mechanical connections.

The temperature sensor 31 can measure a temperature of the steering control module 220 and provide information on the measured temperature to the controller 50. The current sensor 32 can measure an assist current (or an assist steering force) supplied from the steering motor power supply 20 to the steering actuator 230 (or the steering motor 231), and supply information on the measured assist current to the controller 50. Also, the motor position sensor 33 can measure a position of the steering motor and supply information on the position of the steering motor to the controller 50. As described above, the motor position sensor 33 may be included in the steering control module 220; however, embodiments of the present disclosure are not limited thereto. For example, the motor position sensor 33 may be provided separately from the steering control module 220.

In some embodiments, one or more communication devices 40 may be used. The communication device 40 may include at least one of an internal communication device and an external communication device. In a case where multiple steering control modules are used, respective internal communication devices located in the steering control modules can be linked and receive or provide information to each other. In a case where an external communication device is connected to a vehicle, vehicle status information (e.g., vehicle speed information, etc.) can be obtained from the vehicle via the external communication device, or provide information related to the steering system to the vehicle. Such internal and/or external communication devices may be connected by at least one of electrical, magnetic, and mechanical connections.

In some embodiments, one or more controllers 50 may be used. The controller 50 can be connected to each component of the steering control module 220 to provide or receive information, and control the operation of each component of the steering control module 220 based on the information.

For example, based on at least one of steering torque information of the steering wheel, steering angle information of the steering wheel, temperature information, assist current information, position information (e.g., position information of the input-side mechanism, position information of the output-side mechanism, and position information of the steering motor etc.), vehicle status information (e.g., vehicle speed information), input power status information, short circuit (or overcurrent) status information, current detection information of the filter, and steering motor status information, the controller 50 can generate a steering motor control signal and supply the generated signal to the steering motor power supply 20 (or the switch element driver 21), or generate a disconnection/connection control signal (e.g., a clutch control signal) and supply the generated signal to the connection/disconnection mechanism.

The controller 50 may include a micro controller; however, embodiments of the present disclosure are not limited thereto. For example, the controller 50 may include any types of devices (or computers) capable of processing (or executing and computing) programs.

The controller monitor 60 may be connected to the controller 50. The controller monitor 60 can monitor an operating status of the controller 50. For example, the controller 50 can supply a watchdog signal to the controller monitor 60. Based on the watchdog signal supplied by the controller 50, the controller monitor 60 can be cleared, or generate a reset signal and provide the generated signal to the controller 50.

The controller monitor 60 may include a watchdog; however, embodiments of the present disclosure are not limited thereto. For example, the controller monitor 60 may include any devices capable of monitoring the controller. In particular, the watchdog may include a window watchdog having a deadline, that is, a start and an end.

The operation power converter 70 may be connected to the filter 10. The operation power converter 70 can generate an operating voltage for each component of the steering control module 220 by converting the filtered electric energy of the filter 10. The operation power converter 70 may include at least one of a DC-DC converter and a regulator; however, embodiments of the present disclosure are not limited thereto. For example, the operation power converter 70 may include any devices capable of generating an operating voltage for each component of the steering control module 220 and/or for one or more components outside of the steering control module 220 by converting the filtered electric energy of the filter 10.

The steering control module 220 may include an electronic control unit (ECU); however, embodiments of the present disclosure are not limited thereto. For example, the steering control module 220 may include any devices (or module, systems, etc.) capable of electronically controlling.

Figure 3:
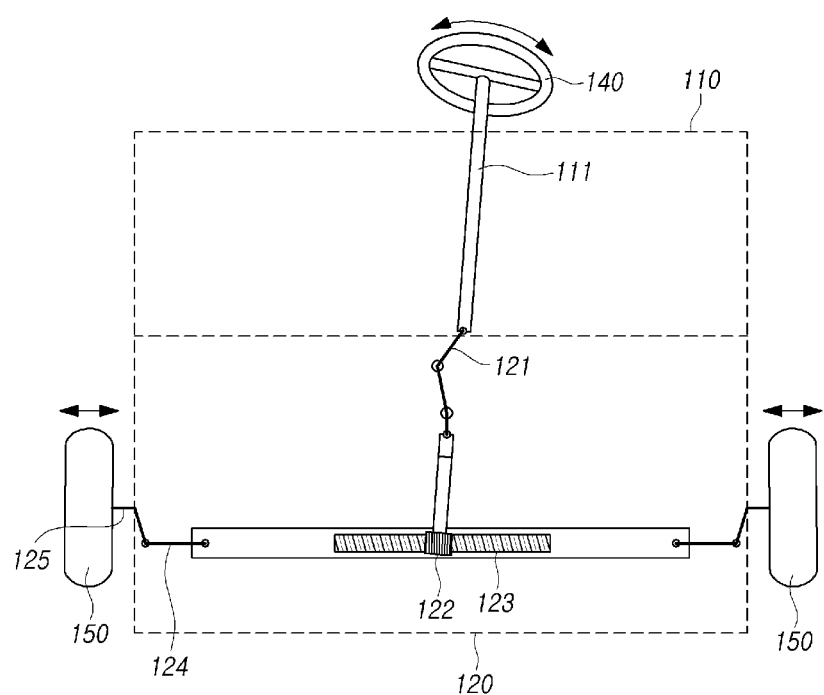
FIGS. 3 and 4 illustrate configurations of steering apparatuses according to aspects of the present disclosure.
Figure 4:
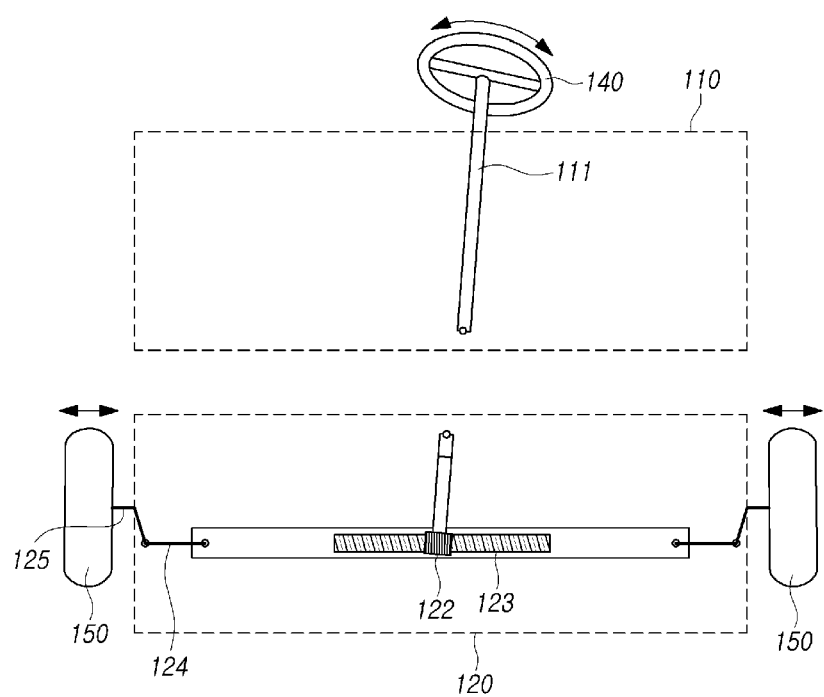

FIGS. 3 and 4 illustrate configurations of steering apparatuses according to aspects of the present disclosure.

Referring to FIG. 3, the steering apparatus according to aspects of the present disclosure may include an input-side mechanism 110 connected to the steering wheel 140, and an output-side mechanism 120 mechanically connected to the input-side mechanism 110 and connected to the vehicle wheel 150, and the like.

The input-side mechanism 110 can rotate in a rotational direction of the steering wheel 140 or in a direction opposite to the rotational direction of the steering wheel 140, and include the steering shaft 111 connected to the steering wheel 140, and the like.

The output-side mechanism 120 can change a steering angle (or a movement, etc.) of the vehicle wheel 150, and include at least one of a universal joint 121, a pinion 122, a rack 123, a tie rod 124, and a knuckle arm 125 etc.

The steering actuator 230 can be located on, and assist with, any one of the input-side mechanism 110 and the output-side mechanism 120. For example, in a case where the steering actuator 230 is positioned on a steering shaft 111 of the input-side mechanism 110, the steering system according to aspects of the present disclosure may be a C-EPS type, and in a case where the steering actuator 230 is positioned on the output-side mechanism 120, the steering system according to aspects of the present disclosure may be a R-EPS type. Further, in a case where the steering actuator 230 is positioned on the pinion 122 of the output-side mechanism 120, the steering system according to aspects of the present disclosure may be a P-EPS type.

Referring to FIG. 4, the steering apparatus according to aspects of the present disclosure may include an input-side mechanism 110 connected to the steering wheel 140, and an output-side mechanism 120 mechanically disconnected to the input-side mechanism 110 and connected to the vehicle wheel 150, and the like. That is, the steering apparatus 100 according to aspects of the present disclosure may be a steer-by-wire (SbW) steering apparatus.

The input-side mechanism 110 can rotate in a rotational direction of the steering wheel 140 or in a direction opposite to the rotational direction of the steering wheel 140, and include the steering shaft 111 connected to the steering wheel 140, and the like.

The output-side mechanism 120 can change a steering angle (or a movement, etc.) of the vehicle wheel 150, and include at least one of a pinion 122, a rack 123, a tie rod 124, and a knuckle arm 125 etc.

The steering assist apparatus 200 may include an input-side steering assist apparatus for assisting the input-side mechanism 110 and an output-side steering assist apparatus for assisting the output-side mechanism 120. Further, the input-side mechanism 110 and the input-side steering assist apparatus may be referred to as a steering feedback actuator (SFA), and the output-side mechanism 120 and the output-side steering assist apparatus may be referred to as a road wheel actuator (RWA).

Figure 5:
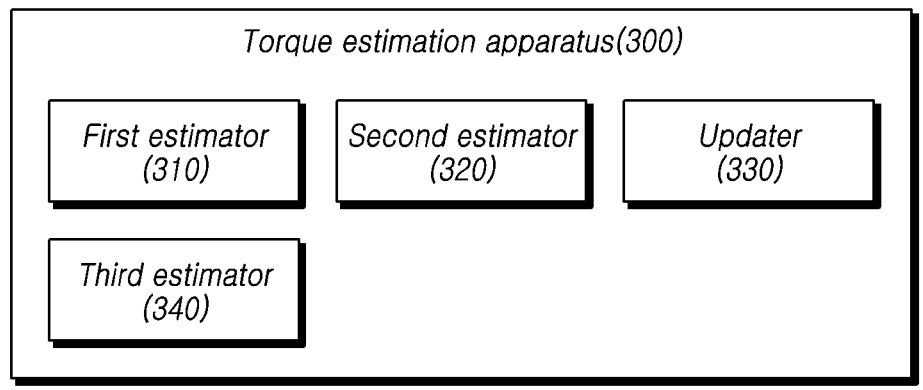
FIG. 5 is a functional block diagram of a torque estimation apparatus according to aspects of the present disclosure.

FIG. 5 is a functional block diagram of a torque estimation apparatus according to aspects of the present disclosure.

Referring to FIG. 5, the torque estimation apparatus 300 according to aspects of the present disclosure may include at least one of a first estimator 310, a second estimator 320, an updater 330, and a third estimator 340. In some embodiments, one or more first estimators, 310, one or more second estimators 320, one or more updaters 330, and one or more third estimators 340 may be used. The first estimator 310, the second estimator 320, the updater 330, and the third estimator 340 may be connected by at least one of electrical, magnetic, and mechanical connections.

For example, the torque estimation apparatus 300 according to aspects of the present disclosure may include the first estimator 310 for estimating an eccentric mass of the steering wheel, and a second estimator 320 for estimating an eccentric torque of the steering wheel.

Specifically, the first estimator 310 can estimate an eccentric mass of the steering wheel based on a torque supplied by a driver ("driver torque").

In this case, the driver torque may refer to a force of the driver applied to the steering wheel when the driver operates the steering wheel, and be a substantial torque representing the steering intention of the driver.

In particular, the first estimator 310 can estimate an eccentric mass of the steering wheel based on the driver torque through a machine learning algorithm.

For example, the first estimator 310 can calculate a standard deviation of driver torques and estimate an eccentric mass of the steering wheel based on the standard deviation of the driver torques.

In this case, the first estimator 310 can calculate the standard deviation of the driver torques, for example, based on values of driver torques and a mean value of the driver torque values.

For example, the first estimator 310 can calculate each deviation of driver torques using values of driver torques and a mean value of the driver torque values, and calculate the standard deviation of the driver torques based on each deviation of driver torques.

That is, the first estimator 310 can calculate each deviation of driver torques by subtracting a mean value of the driver torques from each value of the driver torques, and then, calculate the standard deviation of the driver torques by taking the square root of a mean value of each value resulting from squaring each deviation of the driver torques.

The first estimator 310 can estimate an eccentric mass of the steering wheel based on a current standard deviation value and a previous standard deviation value for the driver torques.

For example, the first estimator 310 can estimate the eccentric mass of the steering wheel by multiplying a difference value between the current standard deviation value and the previous standard deviation value for the driver torques, a gain value for the eccentric mass of the steering wheel, and a current eccentric mass value of the steering wheel.

The second estimator 320 can estimate an eccentric torque of the steering wheel based on the eccentric mass of the steering wheel using a steering angle detected by the steering angle sensor.

For example, the second estimator 320 can estimate the eccentric torque of the steering wheel caused by gravity acting on the eccentric mass of the steering wheel using the steering angle detected by the steering angle sensor.

Specifically, the second estimator 320 can estimate the eccentric torque of the steering wheel by using (e.g., multiplying) the eccentric mass of the steering wheel, the gravity acting on the eccentric mass of the steering wheel, a distance between the rotation center of the steering wheel and the mass center of the steering wheel, and the steering angle detected by the steering angle sensor with a sine shape.

The updater 330 can update the eccentric mass of the steering wheel. The updater 330 can store the updated eccentric mass of the steering wheel in a memory.

For example, the updater 330 can determine and update the eccentric mass of the steering wheel through the machine learning algorithm. Specifically, the machine learning algorithm can calculate a standard deviation of driver torques, and estimate an eccentric mass of the steering wheel based on the standard deviation of the driver torques. Here, the machine learning algorithm can be implemented using typical algorithms such as deep learning, support vector machine (SVM), neural network, and the like, and can be learned to update an eccentric mass of the steering wheel. As a result, the updater 330 can estimate an eccentric torque of the steering wheel based on the updated eccentric mass of the steering wheel by using a steering angle detected by the steering angle sensor.

The third estimator 340 can estimate a steering angle of the steering wheel, a steering angular velocity of the steering wheel, and a driver torque based on a steering torque detected by the steering torque sensor, a steering angle detected by the steering angle sensor, and an eccentric torque of the steering wheel.

For example, the third estimator 340 can determine the steering angle of the steering wheel, the steering angular velocity of the steering wheel, and the driver torque as state variables, calculate a state equation for the steering wheel based on the state variables, the steering torque from the steering torque sensor, the steering angle from the steering angle sensor, and the eccentric torque of the steering wheel, and estimate the state variables (the steering angle of the steering wheel, the steering angular velocity of the steering wheel, and the driver torque) based on the state equation for the steering wheel, first to third proportional gains, the steering angle from the steering angle sensor, and the estimated steering angle of the steering wheel.

The updater 330 can update the first to third proportional gains. Thus, the third estimator 340 can determine the steering angle of the steering wheel, the steering angular velocity of the steering wheel, and the driver torque as state variables, calculate the state equation for the steering wheel based on the state variables, the steering torque from the steering torque sensor, the steering angle from the steering angle sensor, and the eccentric torque of the steering wheel, and estimate the state variables (the steering angle of the steering wheel, the steering angular velocity of the steering wheel, and the driver torque) based on the state equation for the steering wheel, updated first to third proportional gains, the steering angle from the steering angle sensor, and the estimated steering angle of the steering wheel.

The updater 330 can determine and update the first to third proportional gains through a Kalman filter.

Figure 6:
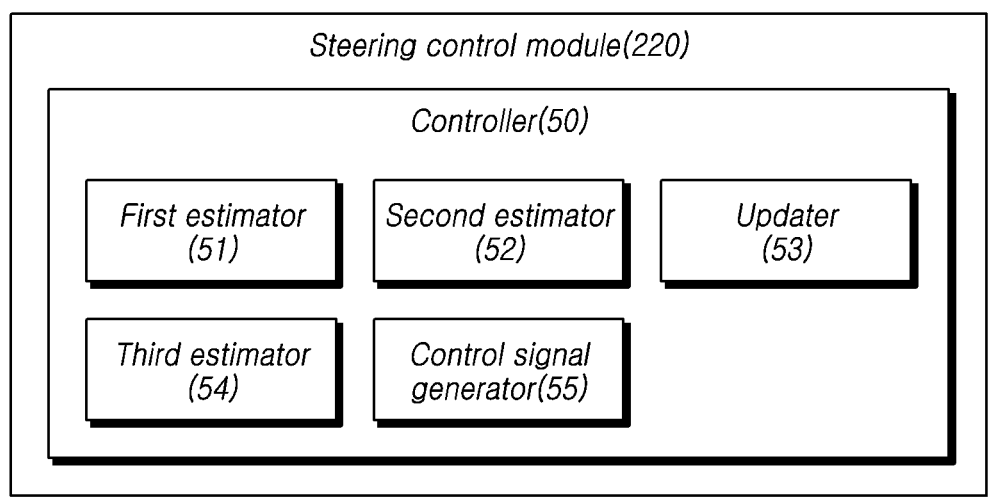
FIG. 6 is a functional block diagram of a steering control module of the steering system according to aspects of the present disclosure.

FIG. 6 is a functional block diagram of the steering control module of the steering system according to aspects of the present disclosure.

Referring to FIG. 6, the steering control module 220 of the steering system according to aspects of the present disclosure may include a controller 50. The controller 50 may include at least one of a first estimator 51, a second estimator 52, an updater 53, a third estimator 54, and a control signal generator 55. In some embodiments, one or more first estimators 51, one or more second estimators 52, one or more updaters 53, one or more third estimators 54, and one or more control signal generators 55 may be used. The first estimator 51, the second estimator 52, the updater 3, the third estimator 55, and the control signal generator 55 may be connected by at least one of electrical, magnetic, and mechanical connections.

The first estimator 51, the second estimator 52, the updater 53, and the third estimator 54 of the controller 50 as shown in FIG. 6 may correspond to (e.g., be substantially equal to and perform substantial equal functions to) the first estimator 310, the second estimator 320, the updater 330, and the third estimator 340 of the torque estimation apparatus 300 described above with reference to FIG. 5, respectively.

Referring to FIGS. 1 to 6, the steering system according to aspects of the present disclosure may include the steering apparatus 100 including the input-side mechanism 110 connected to the steering wheel 140 and the output-side mechanism 120 connected to the vehicle wheel 150, and the steering assist apparatus 200 for assisting at least one of the input-side mechanism 110 and the output-side mechanism 120.

The steering assist apparatus 200 according to aspects of the present disclosure may include the sensor module 240 including at least one of the steering angle sensor 242 for detecting a steering angle and the steering torque sensor 241 for detecting a steering torque, and the steering control module 220 for controlling the operation of the steering motor 231 by controlling the steering motor power supply 20 based on a steering motor control signal. In this case, the steering control module 220 can estimate an eccentric mass of the steering wheel based on driver torque, estimate an eccentric torque of the steering wheel based on the eccentric mass of the steering wheel using the steering angle detected by the steering angle sensor, and generate the steering motor control signal based on a driver torque in which the eccentric torque of the steering wheel is reflected.

In particular, the steering control module 220 may include the first estimator 51 for estimating an eccentric mass of the steering wheel based on driver torque, the second estimator 52 for estimating an eccentric torque of the steering wheel based on the eccentric mass of the steering wheel using a steering angle detected by the steering angle sensor, and the control signal generator 55 for generating a steering motor control signal based on at least one of the steering angle of the steering wheel, a steering angular speed of the steering wheel, and the driver torque.

The control signal generator 55 can generate the steering motor control signal based on a driver torque in which the eccentric torque of the steering wheel is reflected.

Since the first estimator 51, the second estimator 52, the updater 53, and the third estimator 54 included in the steering control module 220 shown in FIG. 6 may be substantially equal to the first estimator 310, the second estimator 320, the updater 330, and the third estimator 340 of the torque estimation apparatus described above with reference to FIG. 5, respectively, therefore, repeated discussions on these components will not be performed for convenience and brevity of the description.

As described above, the steering control module 220 can perform corresponding functions using the first estimator 51, the second estimator 52, the updater 53, the third estimator 54, and the control signal generator 55; however, embodiments of the present disclosure are not limited thereto. For example, such functions may be performed integrally through a single device, for example, the controller 50.

Figure 7:
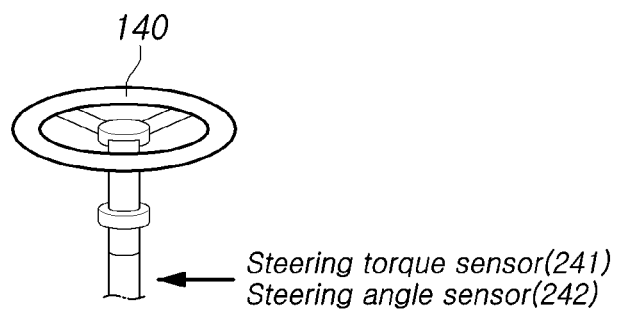
FIG. 7 illustrates the modeling of a steering wheel included in the steering system according to aspects of the present disclosure.

FIG. 7 illustrates the modeling of the steering wheel included in the steering system according to aspects of the present disclosure.

Referring to FIG. 7, the steering torque sensor 241 and the steering angle sensor 242 may be located on the steering wheel 140. The steering torque sensor 241 and the steering angle sensor 242 may be provided individually; however, embodiments of the present disclosure are not limited thereto. For example, the steering torque sensor 241 and the steering angle sensor 242 may be provided in the form of an integrated torque angle sensor (TAS).

The steering torque sensor 241 can detect a steering torque. In particular, the steering torque may be equal to a torsion-bar torque.

The steering angle sensor 242 can detect a steering angle.

Meanwhile, parameters and variables for the steering system may be represented as shown in Table 1.

TABLE 1

| Category | Symbol | Description | Unit |
|---|---|---|---|
| Parameters | | | |
| Steering wheel | $J_{sw}$ | Inertia | kg · m² |
| | $B_{SW}$ | Damping coefficient | N · m · s/rad |
| States and Input variable | | | |
| Steering wheel | $\tau_{drv}$ | Driver torque (unknown) | N · m |
| | $\tau_t$ | Torsion bar torque torque (measured) | N · m |
| Eccentricity | $\tau_e$ | Eccentric torque | N · m |
| | m | Eccentric mass | Kg |
| | g | gravitational acceleration | m/s² |
| | R | Radius of steering wheel | |

Here, in steering system dynamics, an input of the steering system may be a torsion bar torque, and an output of the steering system may be a steering angle.

A state equation for the steering wheel, that is, the augmented reduced order state equation for the steering wheel, can be expressed as Equation 1. That is, the steering angle of the steering wheel, the steering angular speed of the steering wheel, and driver torque are determined as state variables, and the state equation of the steering wheel can be calculated based on the state variables, a torsion bar torque detected by the steering torque sensor, a steering angle detected by the steering angle sensor, and an eccentric torque of the steering wheel.

$$\dot{z}_a = A_{new} z_a + B_{new}(\tau_t + \tau_e) + B_w \hat{\tau}_{drv}$$
$$y = C_{new} z_a$$
$$z_a = [\tau_{dvr} \; \theta_{sw} \; \omega_{sw}]^T$$
$$A_{new} = \begin{bmatrix} 0 & 0 & 0 \\ 0 & 0 & 1 \\ \frac{1}{J_{sw}} & 0 & -\frac{B_{sw}}{J_{sw}} \end{bmatrix}, B_{new} = \begin{bmatrix} 0 \\ 0 \\ -\frac{1}{J_{sw}} \end{bmatrix},$$

[Equation 1]

$$B_w = \begin{bmatrix} 1 \\ 0 \\ 0 \end{bmatrix}, C_{new} = [0 \; 1 \; 0]$$

Figure 8:
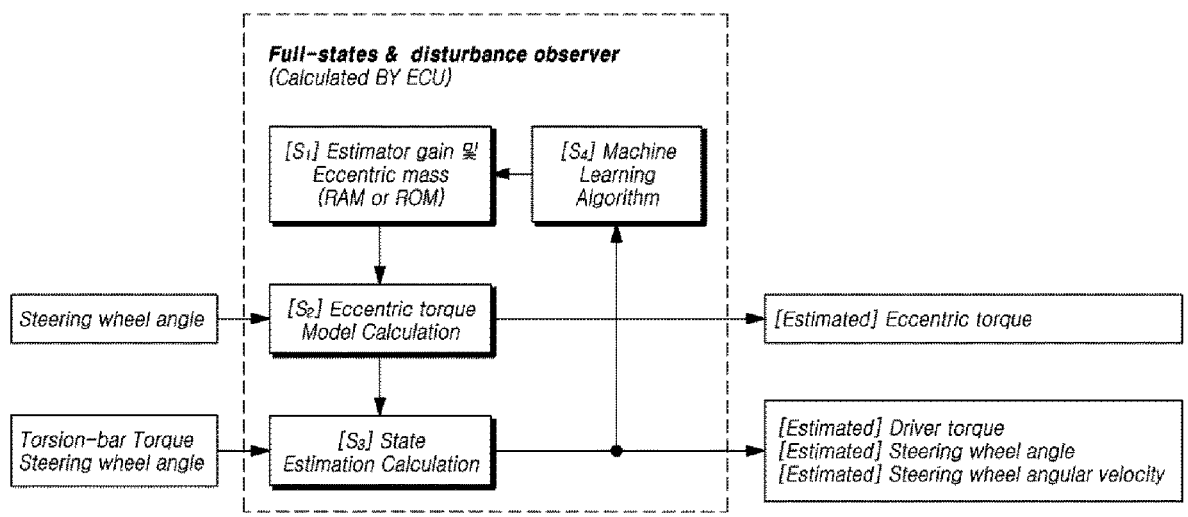
FIG. 8 illustrates an observer according to aspects of the present disclosure.

FIG. 8 illustrates an observer according to aspects of the present disclosure.

Referring to FIG. 8, the torque estimation apparatus 300 according to aspects of the present disclosure may be referred to as a full-states & disturbance observer.

Referring to block S3 of FIG. 8, in block S3, a driver torque, a steering angle of the steering wheel, and a steering angular velocity of the steering wheel can be estimated based on a torsion bar torque detected by the steering torque sensor 241, and a steering angle detected by the steering angle sensor 242, and an eccentric torque of the steering wheel in block S2.

That is, in block S3, the state variables (the driver torque, the steering angle of the steering wheel and the angular velocity of the steering wheel) can be estimated based on the state equation for the steering wheel calculated in FIG. 7, first to third proportional gains (l1 to l3), the steering angle from the steering angle sensor, and the estimated steering angle of the steering wheel.

The state variable observer in block S3 can be expressed as Equation 2.

$$\dot{\hat{z}}_a = A_{new}\hat{z}_a + B_{new}(\tau_t + \tau_e) + L(y - \hat{y})$$ [Equation 2]

where $L = \begin{bmatrix} l_1 \\ l_2 \\ l_3 \end{bmatrix}$ is kalman filter gain.

Referring to block S4, in block S4, an eccentric mass of the steering wheel can be estimated based on the Machine Learning Algorithm.

First, the machine learning algorithm for eccentric mass learning of the steering wheel may require the following preconditions.

① No load condition (Make sure the steering wheel be free body.)

② Exciting torque as sin sweep signal

Further, the machine learning algorithm for the eccentric mass learning of the steering wheel can calculate a standard deviation of driver torques, and estimate the eccentric mass of the steering wheel based on the standard deviation of the driver torques.

An equation for calculating the standard deviation of driver torques can be expressed as Equation 3.

$$\hat{\tau}_{drv} \approx (m - \hat{m}_{old})gR \sin(\theta_{sw})$$

$$\sigma = \sqrt{E((\hat{\tau}_{drv} - E(\hat{\tau}_{drv}))^2)}$$ [Equation 3]

where E is mean value and σ is standard deviation.

An equation for estimating the eccentric mass of the steering wheel based on the standard deviation of the drivers torques can be expressed as Equation 4.

$$\hat{m}_{new} = \hat{m}_{now} K_{step}(\sigma_{now} - \sigma_{old})$$ [Equation 4]

where $K_{step}$ is machine learning update gain.

Referring to block S1, in block S1, estimator gains, that is, first to third proportional gains, and the eccentric mass of the steering wheel can be updated.

In particular, the estimator gains, that is, the first to third proportional gains can be determined through a kalman filter. The Kalman filter equation can be expressed as Equation 5.

$$K = \text{kalman}(A_{new}, C_{new}, W, V) \quad \text{[Equation 5]}$$

Referring to block S2, in block S2, the eccentric torque of the steering wheel can be calculated.

An equation for calculating the eccentric torque of the steering wheel can be expressed as Equation 6.

$$\tau_e = mgR \sin(y) \quad \text{[Equation 6]}$$

m is mass of eccentric torque.
R is equivalent radius of steering wheel.
g is gravity acceleration.

Figure 9:
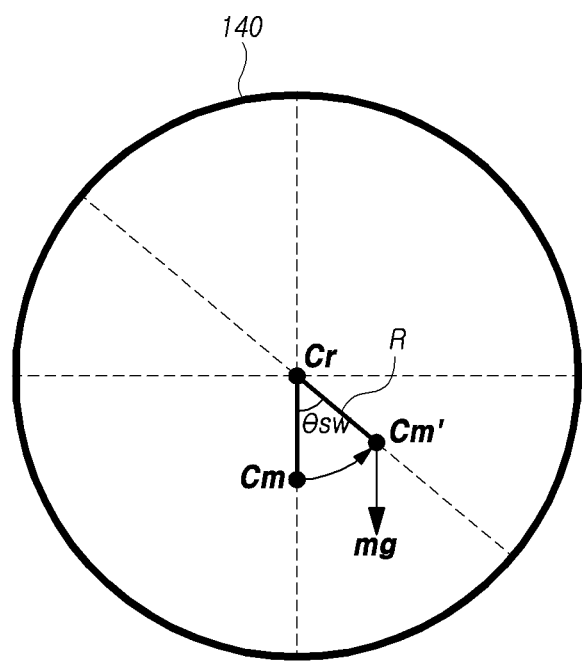
FIG. 9 is a diagram for explaining an eccentric torque of the steering wheel included in the steering system according to aspects of the present disclosure.

FIG. 9 is a diagram for explaining the eccentric torque of the steering wheel included in the steering system according to aspects of the present disclosure.

Referring to FIG. 9, when the steering wheel rotates, the center of mass of the steering wheel may move from Cm to Cm' based on a steering angle θsw detected by the steering angle sensor. Accordingly, the eccentric torque of the steering wheel 140 may be expressed as the multiplication of an eccentric mass (m) of the steering wheel, the gravity (g) acting on the eccentric mass (m) of the steering wheel, and a distance R between the rotational center (Cr) of the steering wheel and the mass center (Cm) of the steering wheel, and a steering angle (θsw) detected by the steering angle sensor with the sine shape.

Hereinafter, a steering assist method according to aspects of the present disclosure will be described with reference to accompanying drawings. The steering assist method according to aspects of the present disclosure may be performed through the torque estimation apparatus, the steering control apparatus, the steering assist apparatus, and the steering system. Thus, discussions on corresponding configurations equal, or substantially equal, to the torque estimation apparatus, the steering control apparatus, the steering assist apparatus, and the steering system described above with reference to FIGS. 1 to 9 will be omitted for brevity and convenience of description.

Figure 10:
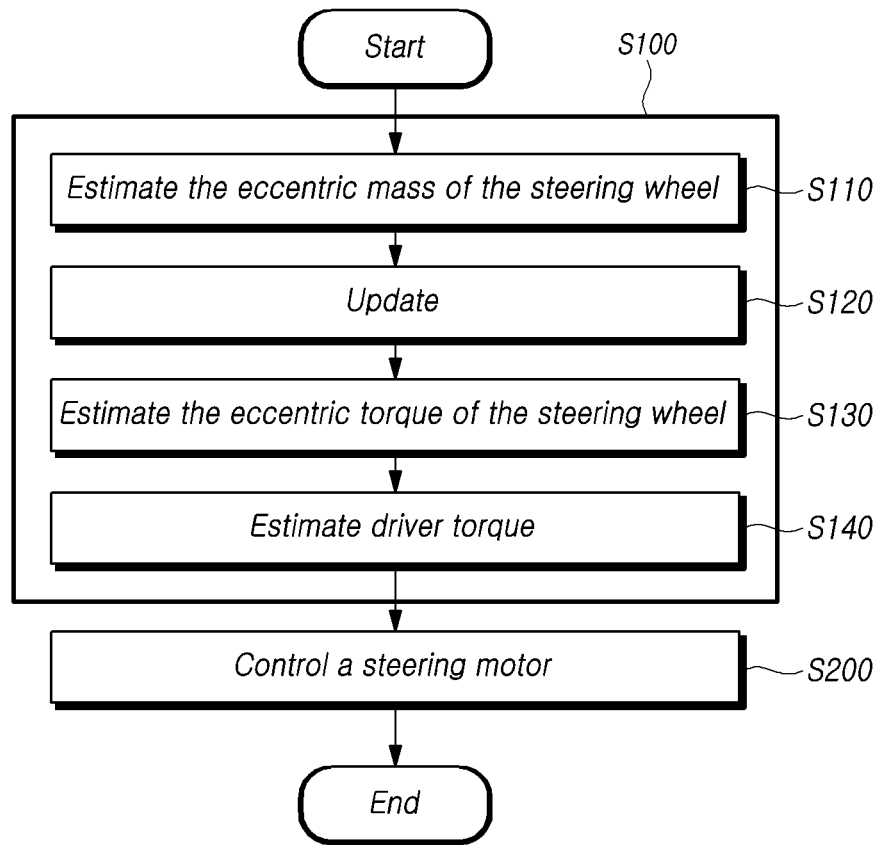
FIG. 10 is a flow sequence illustrating a steering assist method according to aspects of the present disclosure.

FIG. 10 is a flow sequence illustrating the steering assist method according to aspects of the present disclosure.

Referring to FIG. 10, the steering assist method according to aspects of the present disclosure may include at least one of a torque estimation method S100, and a steering motor control method S200.

The torque estimation method S100 according to aspects of the present disclosure may include at least one of estimating an eccentric mass of the steering wheel at step S110, updating at step S120, and estimating an eccentric torque of the steering wheel at step S130, and estimating a driver torque at step S140.

Specifically, the eccentric mass of the steering wheel can be estimated based on the driver torque, at step S110.

In particular, in step S100, the eccentric mass of the steering wheel can be estimated based on the driver torque through the machine learning algorithm.

For example, in step S100, a standard deviation of driver torques can be calculated, and an eccentric mass of the steering wheel can be estimated based on the standard deviation of the driver torques.

In this case, in step S100, the standard deviation of the driver torques can be calculated based on values of driver torques and a mean value of the driver torque values.

For example, in step S100, each deviation of driver torques can be calculated using values of driver torques and a mean value of the driver torque values, and a standard deviation of the driver torques can be calculated based on each deviation of driver torques.

That is, in step S100, each deviation of driver torques can be calculated by subtracting a mean value of the driver torques from each value of the driver torques, and then, the standard deviation of the driver torques can be calculated by taking the square root of a mean value of each value resulting from squaring each deviation of the driver torques.

In step S100, an eccentric mass of the steering wheel can be estimated based on a current standard deviation value and a previous standard deviation value for driver torques.

For example, in step S100, the eccentric mass of the steering wheel can be estimated by multiplying a difference value between a current standard deviation value and a previous standard deviation value for driver torques, a gain value for the eccentric mass of the steering wheel, and a current eccentric mass value of the steering wheel.

Thereafter, an eccentric torque of the steering wheel can be estimated based on the eccentric mass of the steering wheel using a steering angle detected by the steering angle sensor, at step S130.

In step S130, the eccentric torque of the steering wheel can be estimated based on the eccentric mass of the steering wheel using a steering angle detected by the steering angle sensor.

For example, in step S130, the eccentric torque of the steering wheel caused by gravity acting on the eccentric mass of the steering wheel can be estimated using the steering angle detected by the steering angle sensor.

Specifically, in step S130, the eccentric torque of the steering wheel can be estimated by using (e.g., multiplying) an eccentric mass of the steering wheel, gravity acting on the eccentric mass of the steering wheel, a distance between the rotation center of the steering wheel and the mass center of the steering wheel, and a steering angle detected by the steering angle sensor with a sine shape.

Thereafter, a steering motor control signal can be generated based on a driver torque in which the eccentric torque of the steering wheel is reflected, and the operation of a steering motor can be controlled by controlling the steering motor power supply based on the steering motor control signal, at step S200.

Meanwhile, in step S120 after step S110, the eccentric mass of the steering wheel can be updated. In step S120, the updated eccentric mass of the steering wheel can be stored in a memory.

Thus, in step S130, an eccentric torque of the steering wheel can be estimated based on the updated eccentric mass of the steering wheel using the steering angle detected by the steering angle sensor.

After step S130, a steering angle of the steering wheel, a steering angular velocity of the steering wheel, and a driver torque can be estimated based on a steering torque detected by the steering torque sensor, the steering angle detected by the steering angle sensor, and the eccentric torque of the steering wheel, at step S140.

For example, in step S140, the steering angle of the steering wheel, the steering angular velocity of the steering wheel, and the driver torque can be determined as state variables; a state equation for the steering wheel can be calculated based on the state variables, the steering torque from the steering torque sensor, the steering angle from the steering angle sensor, and the eccentric torque of the steering wheel; and the state variables (the steering angle of the steering wheel, the steering angular velocity of the steering wheel, and the driver torque) can be estimated based on the state equation for the steering wheel, first to third proportional gains, the steering angle from the steering angle sensor, and the estimated steering angle of the steering wheel.

Meanwhile, in step S120 after step S110, the first to third proportional gains can be updated. Thus, in step S140, the steering angle of the steering wheel, the steering angular velocity of the steering wheel, and the driver torque can be determines as state variables; the state equation for the steering wheel can be calculated based on the state variables, the steering torque from the steering torque sensor, the steering angle from the steering angle sensor, and the eccentric torque of the steering wheel; and the state variables (the steering angle of the steering wheel, the steering angular velocity of the steering wheel, and the driver torque) can be estimated based on the state equation for the steering wheel, updated first to third proportional gains, the steering angle from the steering angle sensor, and the estimated steering angle of the steering wheel.

In step S120, the first to third proportional gains can be determined and updated through the kalman filter.

The conventional steering system that estimates a steering intention of a driver through information on a steering torque detected by the steering torque sensor has a disadvantage of having a poor accuracy of steering control due to an inaccurate estimation for the steering intention of the driver because an eccentric torque of the steering wheel generated by the eccentricity of the steering wheel is not reflected in the steering torque information; in contrast, the torque estimation apparatus, the steering control apparatus, the steering assist apparatus, the steering system, and the steering assist method according to aspects of the present disclosure can provide advantages of improving the accuracy of steering control because the steering intention of the driver can be more accurately estimated, by estimating the eccentric torque of the steering wheel through the machine learning algorithm, and then estimating state variables including a driver torque in which the estimated eccentric torque of the steering wheel is reflected.

Figure 11:
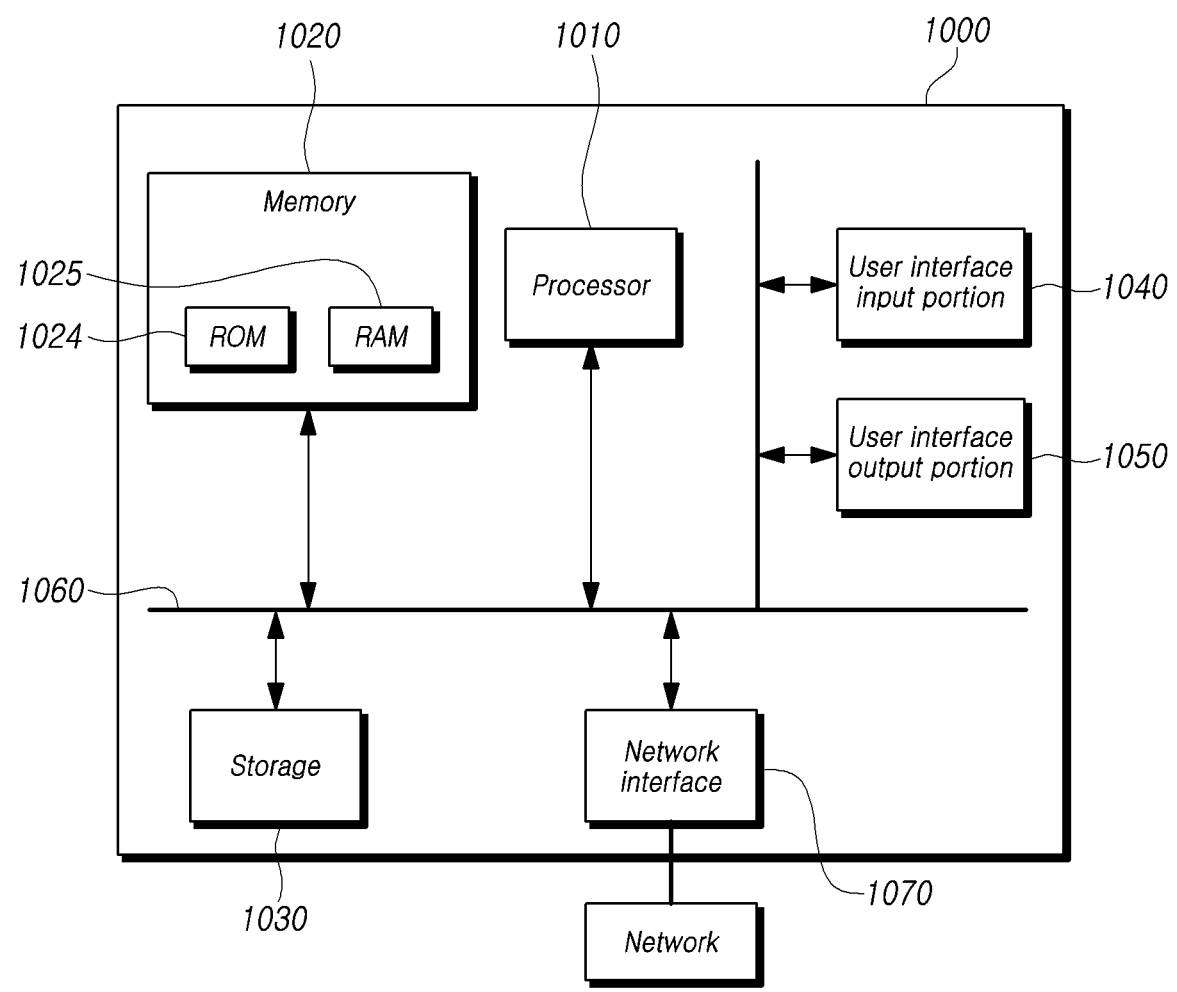
FIG. 11 is a block diagram of a computer system for the torque estimation apparatus, a steering control apparatus, a steering assist apparatus, and the steering system according to aspects of the present disclosure.

FIG. 11 is a block diagram of a computer system for the torque estimation apparatus, the steering control apparatus, the steering assist apparatus, and the steering system according to aspects of the present disclosure.

Referring to FIG. 11, the embodiments described above may be implemented in the computer system, for example, in a computer-readable storage medium. As shown in FIG. 13, the computer system 1000 implementing functions of the torque estimation apparatus, the steering control apparatus, the steering assist apparatus, the steering system, and the like may include at least one or more of one or more processors 1010, one or more memories 1020, one or more storages 1030, and one or more user interface input portions 1040, one or more user interface output portions 1050, and the like, which can communicate with one another via buses 1060. Further, the computer system 1000 may also include a network interface 1070 for accessing a network. The processor 1010 may be a CPU or a semiconductor device for executing processing instructions stored in the memory 1020 and/or the storage 1030. The memory 1020 and the storage 1030 may include various types of volatile/non-volatile storage media. For example, the memory may include ROM 1024 and RAM 1025.

Accordingly, the embodiments described herein may be implemented in a computer-implemented method or with one or more non-volatile computer-readable media in which computer-executable instructions are stored. When executed by a processor, these instructions can perform the at least one method according to the at least one of the embodiments described herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A torque estimation apparatus comprising:
a controller corn rises a first estimator and a second estimator, wherein
the first estimator calculating a standard deviation of driver torques, and estimating an eccentric mass of a steering wheel based on the standard deviation of the driver torques;
the second estimator estimating an eccentric torque of the steering wheel based on the eccentric mass of the steering wheel using a steering angle detected by a steering angle sensor; and
the controller sending a signal to a steering motor based on the eccentric torque of the steering wheel.

2. The torque estimation apparatus according to claim 1, wherein the first estimator calculates each deviation of the driver torques by subtracting a mean value of the driver torques from each value of the driver torques, and calculates the standard deviation of the driver torques by taking square root of a mean value of each value resulting from squaring each deviation of the driver torques.

3. The torque estimation apparatus according to claim 1, wherein the first estimator estimates the eccentric mass of the steering wheel based on a current standard deviation value and a previous standard deviation value for the driver torques.

4. The torque estimation apparatus according to claim 3, wherein the first estimator estimates the eccentric mass of the steering wheel by multiplying a difference value between the current standard deviation value and the previous standard deviation value for the driver torques, a gain value for the eccentric mass of the steering wheel, and a current eccentric mass value of the steering wheel.

5. The torque estimation apparatus according to claim 1, wherein the second estimator estimates the eccentric torque of the steering wheel by using the eccentric mass of the steering wheel, gravity acting on the eccentric mass of the steering wheel, a distance between a rotation center of the steering wheel and a mass center of the steering wheel, and a steering angle detected by the steering angle sensor with a sine shape.

6. The torque estimation apparatus according to claim 1, further comprising a third estimator capable of estimating a steering angle of the steering wheel, a steering angular velocity of the steering wheel, and the driver torques based on a steering torque detected by a steering torque sensor, the steering angle from the steering angle sensor, and the eccentric torque of the steering wheel.

7. The torque estimation apparatus according to claim 6, wherein the third estimator determines the steering angle of the steering wheel, the steering angular velocity of the steering wheel, and the driver torques as state variables, calculates a state equation for the steering wheel based on the state variables, the steering torque from the steering torque sensor, the steering angle from the steering angle sensor, and the eccentric torque of the steering wheel, and estimates the state variables based on the state equation for the steering wheel, first to third proportional gains, the steering angle from the steering angle sensor, and the estimated steering angle of the steering wheel.

8. The torque estimation apparatus according to claim 7, further comprising an updater capable of updating the first to third proportional gains,
wherein the third estimator determines the steering angle of the steering wheel, the steering angular velocity of the steering wheel, and the driver torques as the state variables, calculates the state equation for the steering wheel based on the state variables, the steering torque from the steering torque sensor, the steering angle from the steering angle sensor, and the eccentric torque of the steering wheel, and estimates the state variables based on the state equation for the steering wheel, updated first to third proportional gains, the steering angle from the steering angle sensor, and the estimated steering angle of the steering wheel.

9. The torque estimation apparatus according to claim 8, wherein the updater determines and updates the first to third proportional gains through a kalman filter.

10. The torque estimation apparatus according to claim 8, wherein the updater determines and updates the eccentric mass of the steering wheel through a machine learning algorithm.

11. A steering assist apparatus comprising:
a sensor module including a steering angle sensor for detecting a steering angle; and
a steering control module for controlling operation of a steering motor by controlling a steering motor power supply based on a steering motor control signal,
wherein the steering control module calculates a standard deviation of driver torques, estimates an eccentric mass of a steering wheel based on the standard deviation of the driver torques, estimates an eccentric torque of the steering wheel based on the eccentric mass of the steering wheel using the steering angle detected by the steering angle sensor, and generates the steering motor control signal based on a driver torque in which the eccentric torque of the steering wheel is reflected.

12. The steering assist apparatus according to claim 11, wherein the steering control module calculates each deviation of the driver torques by subtracting a mean value of the driver torques from each value of the driver torques, and calculates the standard deviation of the driver torques by taking square root of a mean value of each value resulting from squaring each deviation of the driver torques.

13. The steering assist apparatus according to claim 11, wherein the steering control module estimates the eccentric mass of the steering wheel by multiplying a difference value between a current standard deviation value and a previous standard deviation value for the driver torques, a gain value for the eccentric mass of the steering wheel, and a current eccentric mass value of the steering wheel.

14. The steering assist apparatus according to claim 11, wherein the steering control module estimates the eccentric torque of the steering wheel by using the eccentric mass of the steering wheel, gravity acting on the eccentric mass of the steering wheel, a distance between a rotation center of the steering wheel and a mass center of the steering wheel, and a steering angle detected by the steering angle sensor with a sine shape.

15. The steering assist apparatus according to claim 11, wherein the sensor module further comprising a steering torque sensor for detecting a steering torque, and
wherein the steering control module further comprising a third estimator capable of estimating a steering angle of the steering wheel, a steering angular velocity of the steering wheel, and the driver torques based on the steering torque detected by the steering torque sensor, the steering angle from the steering angle sensor, and the eccentric torque of the steering wheel.

16. A steering assist method comprising:
after calculating a standard deviation of driver torques, estimating an eccentric mass of a steering wheel based on the standard deviation of the driver torques;
estimating an eccentric torque of the steering wheel based on the eccentric mass of the steering wheel using a steering angle detected by the steering angle sensor; and
after generating a steering motor control signal based on a driver torque in which the eccentric torque of the steering wheel is reflected, controlling operation of a steering motor by controlling a steering motor power supply based on the steering motor control signal.

17. The steering assist method according to claim 16, wherein the estimation of the eccentric mass of the steering wheel includes calculating each deviation of the driver torques by subtracting a mean value of the driver torques from each value of the driver torques, and calculating the standard deviation of the driver torques by taking square root of a mean value of each value resulting from squaring each deviation of the driver torques.

18. The steering assist method according to claim 16, wherein the estimation of the eccentric mass of the steering wheel is performed by multiplying a difference value between a current standard deviation value and a previous standard deviation value for the driver torques, a gain value for the eccentric mass of the steering wheel, and a current eccentric mass value of the steering wheel.

19. The steering assist method according to claim 16, wherein the estimation of the eccentric torque of the steering wheel is performed by using the eccentric mass of the steering wheel, gravity acting on the eccentric mass of the steering wheel, a distance between a rotation center of the steering wheel and a mass center of the steering wheel, and a steering angle detected by the steering angle sensor with a sine shape.

20. The steering assist method according to claim 16, further comprising, after the estimation of the eccentric torque of the steering wheel is performed, estimating a steering angle of the steering wheel, a steering angular velocity of the steering wheel, and the driver torques based on a steering torque detected by a steering torque sensor, the steering angle from the steering angle sensor, and the eccentric torque of the steering wheel.

* * * * *